United States Patent
Reddy et al.

(10) Patent No.: US 10,544,347 B2
(45) Date of Patent: Jan. 28, 2020

(54) FRACTURING FLUIDS COMPRISING ALKANOLAMINE BORATES AS CROSSLINKERS FOR POLYSACCHARIDES

(71) Applicant: Saudi Arabian Oil Company, Dhahran (SA)

(72) Inventors: B. Raghava Reddy, Pearland, TX (US); Feng Liang, Cypress, TX (US); Leiming Li, Sugar Land, TX (US)

(73) Assignee: Saudi Arabian Oil Company, Dhahran (SA)

( * ) Notice: Subject to any disclaimer, the term of this patent is extended or adjusted under 35 U.S.C. 154(b) by 74 days.

(21) Appl. No.: 15/784,755

(22) Filed: Oct. 16, 2017

(65) Prior Publication Data
US 2019/0112519 A1 Apr. 18, 2019

(51) Int. Cl.
*C09K 8/035* (2006.01)

(52) U.S. Cl.
CPC .................................. *C09K 8/035* (2013.01)

(58) Field of Classification Search
CPC .......... C09K 8/035; C09K 8/62; C09K 8/685; C09K 8/887; C09K 8/90
See application file for complete search history.

(56) References Cited

U.S. PATENT DOCUMENTS

| | | | |
|---|---|---|---|
| 2,785,192 A * | 3/1957 | Elbling | C07F 5/04 558/289 |
| 4,514,309 A | 4/1985 | Wadhwa | |
| 4,619,776 A * | 10/1986 | Mondshine | C09K 8/685 166/308.5 |
| 4,766,959 A * | 8/1988 | Allison | C09K 8/512 106/205.3 |
| 5,212,306 A | 5/1993 | Savoca et al. | |
| 5,681,796 A * | 10/1997 | Nimerick | C09K 8/685 507/209 |
| 5,827,804 A | 10/1998 | Harris et al. | |
| 5,944,106 A | 8/1999 | Dalrymple et al. | |
| 6,214,773 B1 | 4/2001 | Harris et al. | |
| 2004/0229756 A1* | 11/2004 | Eoff | C09K 8/10 507/219 |

(Continued)

FOREIGN PATENT DOCUMENTS

| | | |
|---|---|---|
| CN | 104419398 A | 3/2015 |
| EP | 0343294 A1 | 11/1989 |
| WO | 2017023935 | 2/2017 |

OTHER PUBLICATIONS

International Search Report and Written Opinion for related PCT application PCT/US2018/056012 dated Dec. 10, 2018.

*Primary Examiner* — Alicia Bland
(74) *Attorney, Agent, or Firm* — Bracewell LLP; Constance G. Rhebergen; Kevin R. Tamm

(57) ABSTRACT

A method for formulating a hydraulic fracturing fluid composition with increased viscosity and resistance to degradation at increased temperature and pressure. The method includes preparing an alkanolamine borate formulation compatible for mixing with a hydraulic fracturing fluid comprising polysaccharides; preparing the hydraulic fracturing fluid comprising polysaccharides; and mixing the alkanolamine borate formulation with the hydraulic fracturing fluid, such that the alkanolamine borate formulation causes crosslinking of the hydraulic fracturing fluid.

29 Claims, 9 Drawing Sheets

(56) References Cited

U.S. PATENT DOCUMENTS

| | | | |
|---|---|---|---|
| 2006/0264334 A1* | 11/2006 | Gupta | C09K 8/64 |
| | | | 507/214 |
| 2009/0151946 A1* | 6/2009 | Putzig | C09K 8/685 |
| | | | 166/280.2 |
| 2011/0030962 A1* | 2/2011 | Parris | C09K 8/03 |
| | | | 166/310 |
| 2012/0004148 A1 | 1/2012 | Ogle et al. | |
| 2012/0267103 A1* | 10/2012 | Willberg | C09K 8/68 |
| | | | 166/279 |
| 2014/0174742 A1 | 6/2014 | Miralcyan et al. | |

* cited by examiner

FRACTURING FLUIDS COMPRISING ALKANOLAMINE BORATES AS CROSSLINKERS FOR POLYSACCHARIDES

BACKGROUND

Field

The present disclosure relates generally to fracturing fluids used in hydraulic fracturing of hydrocarbon-bearing reservoirs. In particular, the disclosure relates to alkanolamine borates used as crosslinkers in fracturing fluids.

Description of the Related Art

Certain fracturing fluids have historically included inorganic borate or zirconium-based crosslinkers. Organic borate esters are generally hydrolytically unstable in water or are typically too insoluble in water to be suitable as crosslinkers. Inorganic borates have been in use as crosslinkers for guar-based fracturing fluids for several years. The inorganic borates (for example, disodium tetraborate) are typically polyborates with —B—O—B— linkages. However, formulations applying these crosslinkers show greater pressure and shear sensitivity, in addition to temperature sensitivity. Shear and pressure sensitivities of hydraulic fracturing fluids can be problematic during hydraulic fracturing operations when the shear rates and pressures reach greater values. Significant decreases in viscosities due to reversible crosslinking can result in loss of sand suspension abilities, which subsequently can result in poor distribution of proppant within fractures. Additionally, inorganic borates have low water solubility. For example, sodium tetraborate (Borax), an inorganic borate crosslinker has a water solubility of about 4-6 weight percentage (wt. %).

In certain hydraulic fracturing technologies, boric acid and an alkanolamine (or alkylamine) are used as two separate chemicals. Alkanolamine or alkylamine is used as a buffer to generate basic environments, generating hydroxide ions which react with boric acid to generate inorganic borate salt. Amine usages can have a range from about 1% to about 13% by weight, which is significantly greater than the concentration of a typical borate crosslinker agent. Certain prior art systems contain an organotitanate chelate and a borate ion producing compound. Certain prior art systems employ zirconium salts complexed with alkanolamines.

SUMMARY

A crosslinked fluid system that is less pressure and less shear sensitive is provided which improves the efficiency of hydraulic fracturing operations in hydrocarbon-bearing reservoirs. Organic alkanolamine borates are used as crosslinkers for fracturing fluids, for example polysaccharide-containing fracturing fluids. Organic borate esters are generally hydrolytically unstable in water or are typically too insoluble in water to be suitable as crosslinkers. Surprisingly and unexpectedly, certain alkanolamine borates behave to the contrary and are effective as crosslinkers in fracturing fluid formulations. In the present disclosure, pre-reacted, substantially hydrolytically stable, and highly water soluble, discrete single compounds (organic alkanolamine borate compounds) having well-defined properties characteristic of pure compounds, such as melting points, are shown to be effective crosslinkers under a variety of conditions when mixed, for example as solid, with a liquid fracturing fluid composition. Certain examples of the pre-reacted, single compounds, for example triethanolamine borate employed in certain experiments as follows, were formed using a fixed molar ratio of boric acid to alkanolamine, for example triethanolamine, of about 1:1.

Pre-reacted alkanolamine borates of the present disclosure formed by reactions between boric acid, or a borate ester, and an alkanolamine are found to be good crosslinkers for guar-based fracturing fluids, yielding fluids with decreased pressure and shear sensitivities. Exemplified gelled fluids of the disclosure are more stable at temperatures greater than normally observed with inorganic borate salt crosslinkers. The organic alkanolamine borates can provide an additional benefit by allowing compositions of fracturing fluids to be formed from mix water containing greater TDS (total dissolved solids) or seawater. One exemplified alkanolamine borate of the disclosure is triethanolamine borate. Certain alkanolamine based organoborates are commercially available because of their use as corrosion inhibitors added to lubricants.

Therefore, disclosed here is a method for formulating a hydraulic fracturing fluid composition with improved resistance to viscosity decay at increased temperature and pressure, the method including preparing an alkanolamine borate formulation compatible for mixing with a hydraulic fracturing fluid comprising polysaccharides, the alkanolamine borate formulation comprising a pre-reacted alkanolamine borate; preparing the hydraulic fracturing fluid comprising polysaccharides; and mixing the alkanolamine borate formulation with the hydraulic fracturing fluid, such that the alkanolamine borate formulation causes crosslinking of the hydraulic fracturing fluid.

In some embodiments of the method, the alkanolamine borate formulation comprises an alkanolamine borate compound selected from the group consisting of: triethanolamine borate; diethanolamine borate; tri-isopropanolamine borate; n-propanolamine borate; N,N-dimethyl ethanolamine borate; N,N-diethyl ethanolamine borate; N,N-dipropyl ethanolamine borate; and combinations thereof. In some embodiments, the hydraulic fracturing fluid comprises a polysaccharide selected from the group consisting of: guar; hydroxypropyl guar; and combinations thereof. In certain embodiments, the step of mixing is carried out at a pH between about pH 8.5 to about pH 13. Still in other embodiments, the step of mixing is carried out at a pH less than about pH 9.5. In some embodiments, the step of preparing the alkanolamine borate formulation includes mixing the pre-reacted alkanolamine borate with water, and the pre-reacted alkanolamine borate is at least partially hydrolytically stable.

Still in yet other embodiments of the method, the step of preparing the hydraulic fracturing fluid comprising polysaccharides includes hydrating a non-aqueous polysaccharide liquid suspension with water. Still in certain other embodiments, the method further comprises the step of mixing with the hydraulic fracturing fluid composition at least one pH control agent selected from the group consisting of: hydroxide salts; carbonates; bicarbonates; amine-containing organic compounds; and combinations thereof. In some embodiments, the pH control agent comprises tetraethylenepentamine. Still in other embodiments, the method further comprises the step of mixing with the hydraulic fracturing fluid composition at least one antioxidant component selected from the group consisting of: phenols; polyphenols; di-tert-butyl alkyl phenols; sodium thiosulfate; sodium sulfite; sodium bisulfite; thiourea; and combinations of the same.

In certain embodiments, concentration of the alkanolamine borate formulation in the hydraulic fracturing fluid composition is between about 1 gallon per one thousand gallons of fluid (gpt) to about 20 gpt of about 30% by weight alkanolamine borate solution. Still in other embodiments of the method, concentration of the alkanolamine borate formulation in the hydraulic fracturing fluid composition is about 10 gpt of about 30% by weight alkanolamine borate solution.

In certain embodiments, the hydraulic fracturing fluid composition comprises between about 1 gpt to about 20 gpt of about 10% by weight NaOH solution. And, in some embodiments, the step of preparing the hydraulic fracturing fluid comprising polysaccharides includes mixing seawater with a non-aqueous polysaccharide liquid suspension.

Additionally disclosed here is a hydraulic fracturing fluid composition with improved resistance to viscosity decay at increased temperature and pressure, the composition comprising: an alkanolamine borate formulation compatible for mixing with a hydraulic fracturing fluid comprising polysaccharides, the alkanolamine borate formulation comprising a pre-reacted alkanolamine borate; and a hydraulic fracturing fluid comprising polysaccharides, where a suitable concentration of the alkanolamine borate formulation causes crosslinking of the hydraulic fracturing fluid.

In some embodiments of the composition, the alkanolamine borate formulation comprises an alkanolamine borate compound selected from the group consisting of: triethanolamine borate; diethanolamine borate; tri-isopropanolamine borate; n-propanolamine borate; N,N-dimethyl ethanolamine borate; N,N-diethyl ethanolamine borate; N,N-dipropyl ethanolamine borate; and combinations thereof. In other embodiments, the hydraulic fracturing fluid comprises a polysaccharide selected from the group consisting of: guar; hydroxypropyl guar; and combinations thereof. Still in other embodiments, the pH of the hydraulic fracturing fluid composition is between about pH 8.5 to about pH 13. In certain embodiments, the pH of the hydraulic fracturing fluid composition is less than about pH 9.5. In still other embodiments, the hydraulic fracturing fluid composition further comprises water.

In some embodiments of the composition, the hydraulic fracturing fluid composition further comprises seawater. Still in other embodiments, the composition includes at least one pH control agent selected from the group consisting of: hydroxide salts; carbonates; bicarbonates; amine-containing organic compounds; and combinations thereof. Still in other embodiments, the pH control agent comprises tetraethylenepentamine.

In certain embodiments, the composition further includes at least one antioxidant component selected from the group consisting of: phenols; polyphenols; di-tert-butyl alkyl phenols; sodium thiosulfate; sodium sulfite; sodium bisulfate; thiourea; and combinations of the same. Still in other embodiments, concentration of the alkanolamine borate formulation in the hydraulic fracturing fluid composition is between about 1 gallon per one thousand gallons of fluid (gpt) to about 20 gpt of about 30% by weight alkanolamine borate solution. In certain embodiments, concentration of the alkanolamine borate formulation in the hydraulic fracturing fluid composition is about 10 gpt of about 30% by weight alkanolamine borate solution. In still some other embodiments, the hydraulic fracturing fluid composition comprises between about 1 gpt to about 20 gpt of about 10% by weight NaOH solution.

In some embodiments of the composition, viscosity reduction of the hydraulic fracturing fluid composition at about 5,000 pounds per square inch gauge (psig) is less than about 10%. Still in other embodiments, viscosity reduction of the hydraulic fracturing fluid composition at about 8,000 pounds per square inch gauge (psig) is less than about 15%.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions of and methods for using fracturing fluids comprising alkanolamine borates as crosslinkers for polysaccharides, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
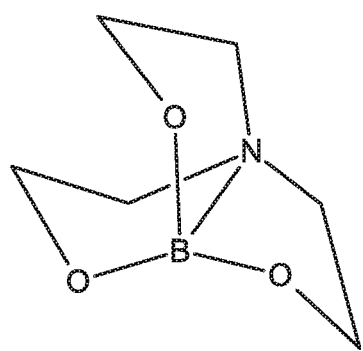
FIG. 1 is a drawing showing the molecular structure of triethanolamine borate, also referred to as 2,2',2"-Nitrilotriethyl borate and Boratrane.

Referring first to FIG. 1, a molecular structure is provided showing triethanolamine borate, also referred to as 2,2',2"-Nitrilotriethyl borate and Boratrane. The amine nitrogen is believed to reversibly coordinate with boron, and the covalent B—O bonds are also believed to dissociate reversibly allowing for their displacement by the hydroxyl groups present in guar-based fracturing fluids for crosslinking. Other suitable alkanolamines which can be used to form alkanolamine borates of the present disclosure include, but are not limited to, tri-isopropanolamine, diethanolamine, n-propanolamine, N,N-dimethyl ethanolamine, N,N-diethyl ethanolamine, N,N-dipropyl ethanolamine, similar alkanolamine compounds, and combinations thereof, which can be used to form respectively, tri-isopropanolamine borate, diethanolamine borate, n-propanolamine borate, N,N-dimethyl ethanolamine borate, N,N-diethyl ethanolamine borate, N,N-dipropyl ethanolamine borate, similar alkanolamine borates, and combinations thereof.

In one embodiment, suitable alkanolamine borates do not completely disassociate to form boric acid when added to water. That is, the alkanolamine borates are at least partially hydrolytically stable when exposed to water. In an embodiment, the alkanolamines either form or are capable of forming cyclic borate structures with one, two or three 5- or 6-member rings with boron, containing boron nitrogen and carbon atoms. Triethanolamine borate, as shown in the structure in FIG. 1, is an example of an alkanolamine borate containing three 5-membered rings. In an embodiment, the molar ratio of alkanolamine to boron in the alkanolamine borate is in range of about 1:1 to about 3:1. An example of an alkanolamine borate compound containing 3:1 aminoalcohol to boron molar ratio is triethanolamine triborate, $N[CH_2CH_2O—B(OH)_2]3$. Methods of synthesis of alkanolamine borates have been described in U.S. Pat. No. 3,103,531.

Embodiments of alkanolamine borate compounds of the present disclosure offer a drop-in replacement for currently-used inorganic borate crosslinkers, with several surprising and unexpected advantages over the inorganic borate crosslinkers. Stock aqueous solutions of alkanolamine borate crosslinkers, for example triethanolamine borate, can be very greatly concentrated at greater than about 30% by weight and greater than about 95% by weight.

The pH range for forming alkanolamine borate crosslinked fracturing fluids with guar-based polymers in some embodiments is between about pH 8.5 to about pH 13. The alkanolamine borates are instantaneously crosslinking (as shown by the vortex closure time of less than 30 seconds when the crosslinked fluid is prepared in a Waring blender at an agitation rate of 2,000 rotations per minute (RPM)) with guar-based fluids. In embodiments of the disclosure, latent acid generators can be effective viscosity breakers, because the crosslinked fluids show lesser viscosity values at pH values near about 8. In embodiments of the present disclosure, lesser concentrations of polysaccharide polymer, for example guar or hydroxypropyl guar (HPG) (for example equal to or less than about 30 pptg) are needed, which is significantly less than the polymer loading concentrations required with inorganic borate crosslinkers.

EXPERIMENTS

One exemplified crosslinker used in the experiments here was triethanolamine borate. The triethanolamine borate was a white powder with a melting point of between about 235° C. to about 237° C., and it was readily soluble in water. A 30% by weight crosslinker solution was prepared by adding 3 grams of triethanolamine borate to 7 milliliters (mL) of deionized (DI) water. Both of a non-aqueous guar liquid suspension (PAPS-435L; 4 pounds per gallon (ppg) slurry) and a non-aqueous hydroxypropyl guar (HPG) liquid suspension (HPG-AS-0010; 4 ppg slurry) were acquired from Precision Additives of Houston, Tex. Triethanolamine borate was obtained from TCI America of Portland, Oreg., with a greater than about 95% pure or active concentration with a reported melting point of 235-237° C., and triethanolamine borate was used as received.

Preparation Procedure for Fracturing Fluids.

Gel samples for viscometer tests were first prepared using a Waring blender. In general, a certain quantity of the guar-based polymer was hydrated in tap water. Additional additives such as pH control agent(s) and antioxidant(s) were added to the base polymer solution followed by different amounts of the crosslinker solution. The pH range for forming crosslinked fluid with guar-based polymers is between about pH 8.5 to about pH 13. Example pH control agents include, but are not limited to, inorganic bases such as hydroxide salts, carbonates, bicarbonates and amine-containing organic compounds such as the one used in Example 4 described as follows, tetraethylenepentamine, and combinations of the foregoing. An antioxidant is an additive which can be used in fracturing fluid formulations to prevent oxidation or degradation of polymers in order to stabilize the fluid. Antioxidants can be selected from the group including, but not limited to, phenols, polyphenols, di-tert-butyl alkyl phenols, sodium thiosulfate, sodium sulfite, sodium bisulfite, thiourea, and combinations of the same.

Viscosity Measurement Under High Pressure High Temperature (HPHT).

Sample volumes for testing of about 100 mL were prepared for each test. A 52 mL fluid sample was placed into a Grace M5600 high pressure high temperature (HPHT) rheometer equipped with a B5 bob. Tests were performed using a heating profile with the API RP 39 shear ramp procedure in addition to or alternative to a shear-rate of $100\ s^{-1}$. API RP 39 is the American Petroleum Institute Recommended Practice 39 entitled "Recommended practices on measuring the viscous properties of a cross-linked water-based fracturing fluid." To measure the viscosity of a fracturing fluid sample under the conditions designed to simulate those in a high pressure and high temperature (HPHT) subterranean reservoir formation, about 52 mL of the fluid sample was placed into a rheometer such as a Fann 50-type or Grace M5600 HPHT rheometer.

The API RP 39 schedule consists of continued fluid shearing at $100\ s^{-1}$ and a series of shearing ramps at 100, 75, 50, 25, 50, 75 and $100\ s^{-1}$ once the fluid temperature is within 5° F. of the test temperature and occurring periodically for every 30 min. The modified API RP 39 procedure used in FIG. 4 was to add 5 min of shear at $511\ s^{-1}$ before the typical API RP 39 procedure.

Tests were performed at estimated bottomhole temperatures, following the API RP 39 schedule and under about 400 pounds per square inch gauge (psig) of nitrogen. The bottomhole temperature refers to the temperature in the borehole at total depth at the time it is measured. The API RP 39 schedule consisted of continuous fluid shearing at $100\ s^{-1}$ shear rate, followed by a series of shearing ramps at 100, 75, 50, 25, 50, 75, and $100\ s^{-1}$ once the fluid temperature was within 5° F. of the bottomhole temperature. The shear ramp cycles were repeated periodically after every 30 minutes.

High Pressure Rheology Testing.

Figure 2:
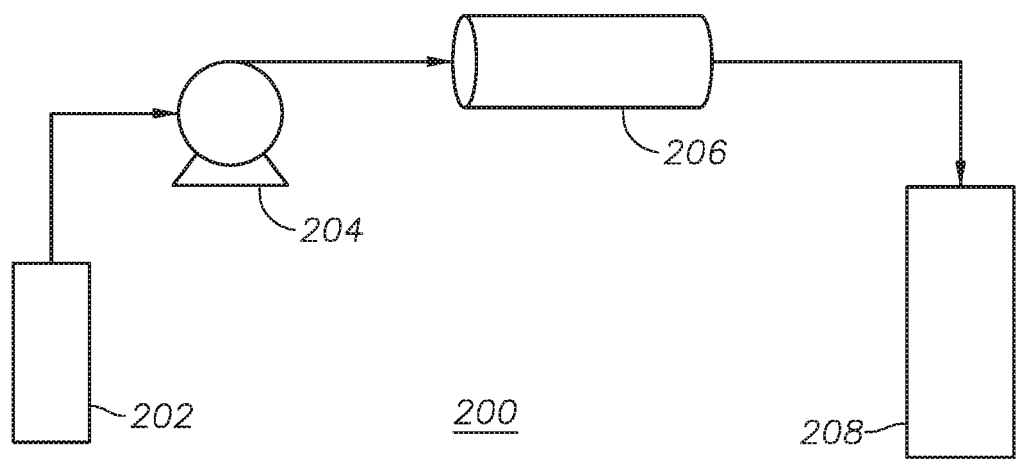
FIG. 2 is a diagram showing a modified Anton Parr rheometer for introducing viscous fluid into a pressure cell for testing.

Referring now to FIG. 2, a diagram is provided showing a modified Anton Parr rheometer for introducing viscous fluid into a pressure cell for testing. System 200 includes a deionized water source 202, a syringe pump 204, an accumulator 206, and an Anton Parr 1,000 bar pressure cell 208. Steady-shear measurements were carried out on the MCR 102 Anton Parr rheometer, displayed as system 200. With a pre-modified setup (hand pump in Anton Parr rheometer), viscous fluid could not be introduced into the pressure cell 208. System 200 was modified by adding a Teledyne ISCO syringe pump 204 and an accumulator 206, into which the gel was placed prior to being injected into the pressure cell 208.

Example 1

Figure 3:
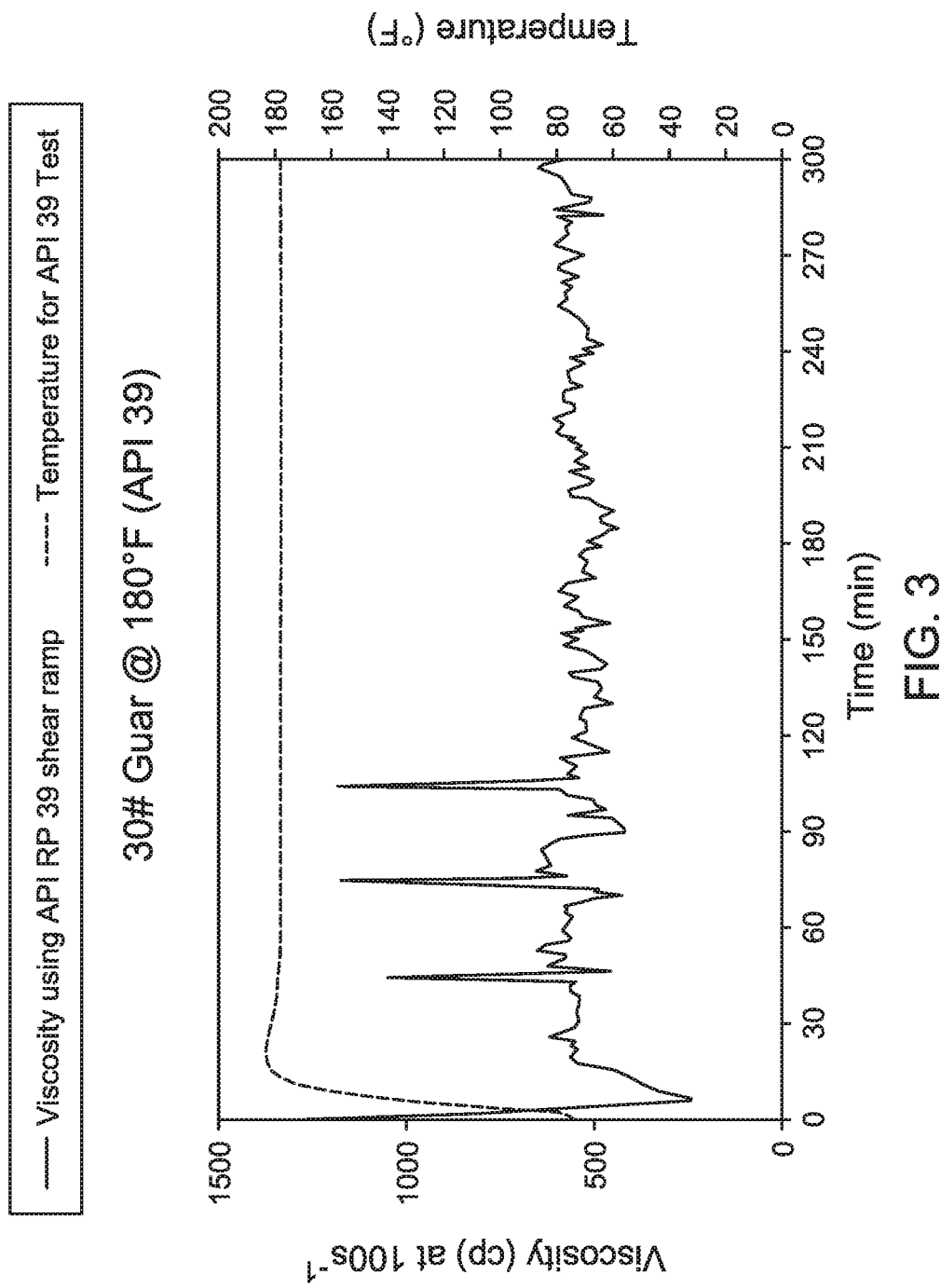
FIG. 3 is a graph showing viscosity (in centipoise (cP)) at 180° F. (Fahrenheit) for 30 pounds per one thousand gallons (pptg) guar crosslinked with triethanolamine borate at pH 12.7 using American Petroleum Institute (API) Recommended Practice (RP) 39 shear ramp testing.

This example tested a triethanolamine borate crosslinked guar-based fluid. FIG. 3 is a graph showing viscosity (in centipoise (cP)) at 180° F. (Fahrenheit) for 30 pounds per one thousand gallons (pptg) guar slurry crosslinked with triethanolamine borate at pH 12.7 using American Petroleum Institute (API) Recommended Practice (RP) 39 shear ramp testing. The graph shows the viscosity profile at 180° F. for crosslinked fluids prepared with 30 pptg guar slurry, 20 gallons per one thousand gallons of fluid (gpt) of 10% by weight NaOH solution, and 1 gpt of 30% by weight triethanolamine borate solution at pH 12.7 using the API RP 39 shear ramp testing procedure. Fluid viscosity remained nearly constant at around 500 cP at the shear rate of 100 s$^{-1}$ for 5 hours.

Figure 4:
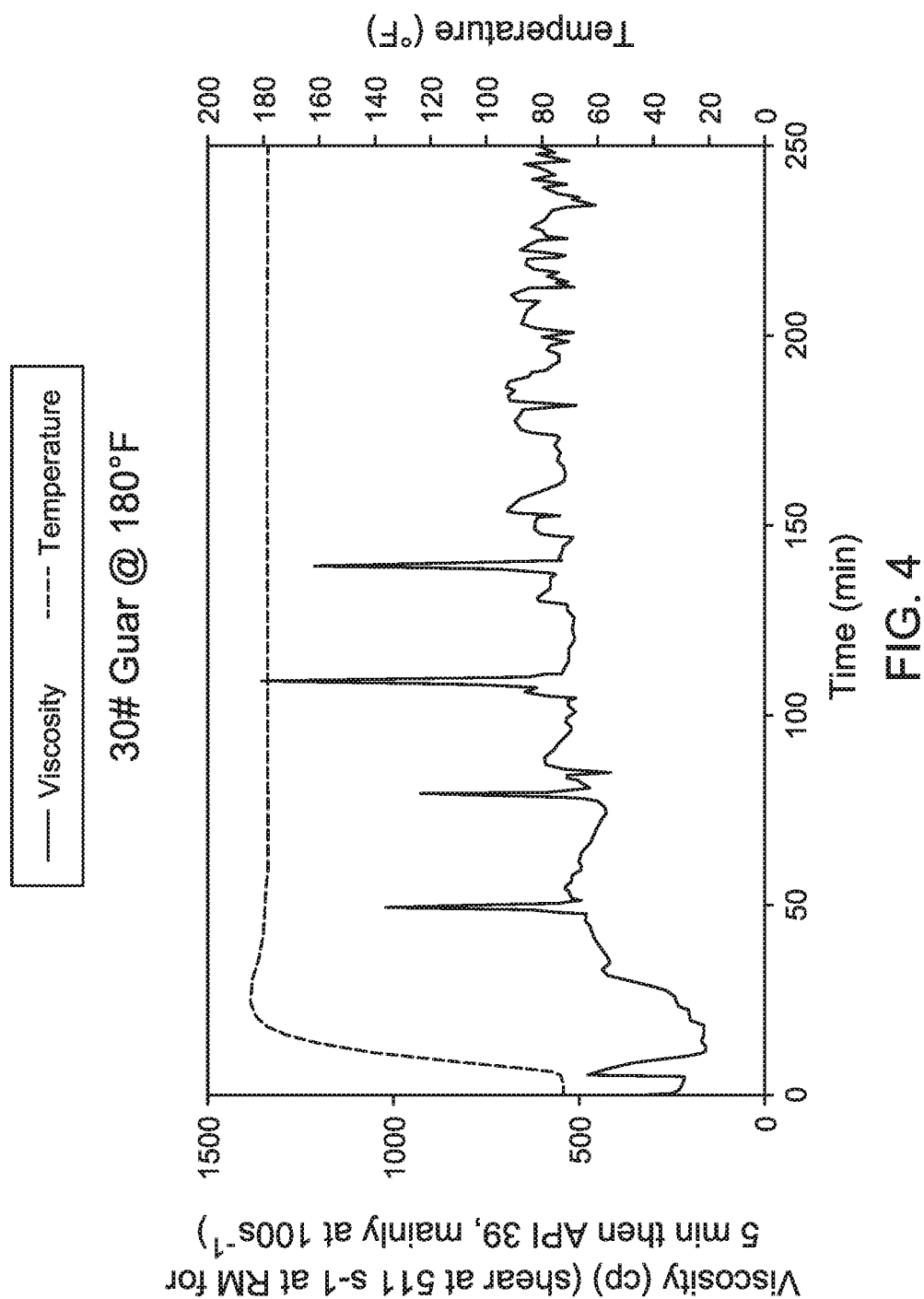
FIG. 4 is graph showing viscosity in cP at 180° F. for 30 pptg guar crosslinked with triethanolamine borate at pH 12.7 using a modified API RP 39 shear ramp testing procedure with shear at 511 1/seconds ($s^{-1}$) for 5 minutes before heating the gel to 180° F.

To test the shear sensitivity of the fluid system, a viscosity profile was built based on a modified API RP 39 testing procedure with shearing the fluid at 511 s$^{-1}$ for 5 min at room temperature then heating to 180° F. FIG. 4 shows the viscosity profile of the same fluid from Example 1 (30 pptg guar slurry, 20 gpt of 10% by weight NaOH solution and 1 gpt of 30% by weight triethanolamine borate solution at pH 12.7) with a modified testing profile. The viscosity of the crosslinked gel stays constant at around 500 cP at 100 s$^{-1}$ for at least 4 hours under the test conditions. The test indicated that the crosslinked gel is shear-stable, and the fluid viscosity was not reduced by greater shear.

Typically, gel viscosity in compositions comprising guar and borates shows reversibility to a number of influences, including mechanical shear, pH, and temperature. Notably, these fluids suffer a decrease in viscosity upon an increase in pressure, which can be detrimental in hydrocarbon production operations. This process has been found to be reversible. In order to test the pressure sensitivity of crosslinked fluids here, a fluid was prepared in the same way as the fluid tested in FIG. 3.

Figure 5:
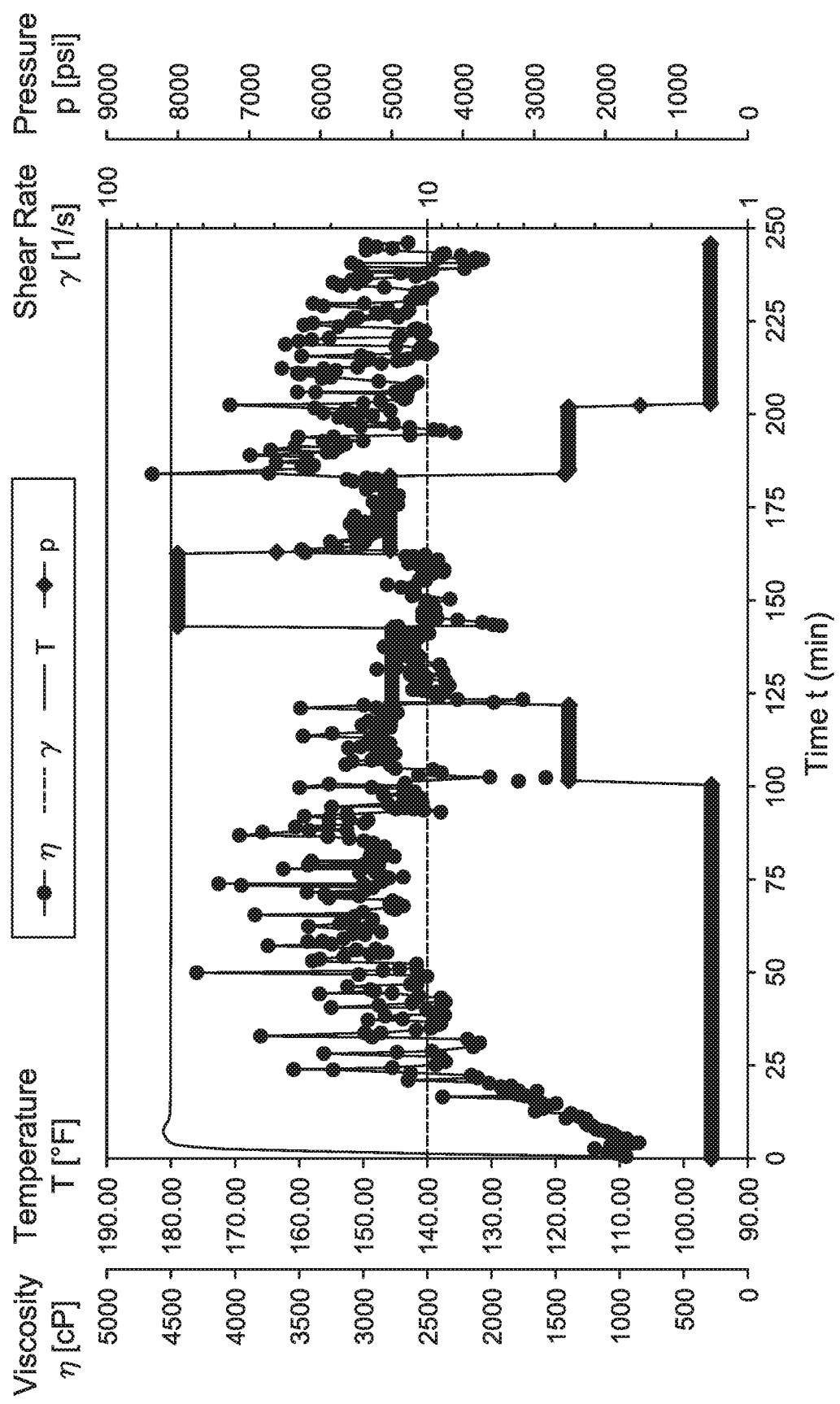
FIG. 5 is a graph showing viscosity in cP at a shear rate of 10 $s^{-1}$ measuring the response of a crosslinked 30 pptg guar-based fracturing fluid under different pressures at 180° F.

As shown in FIG. 5, the fluid was tested in the 1,000 bar pressure cell 208 at 180° F. by maintaining the pressure at 500 psig for 100 minutes, then increasing the pressure to 2,500 psig for 10 minutes, then increasing the pressure to 5,000 psig for 10 minutes, and finally increasing the pressure to 8,000 psig for 10 minutes. Then the pressure was decreased to 5,000 psig for 10 minutes, decreased to 2,500 psig for 10 minutes, and then to 500 psig for 20 minutes (as shown in FIG. 5). The averaged viscosities under different pressures are shown in Table 1 as follows. Viscosity reduction or decay under greater pressures was quite small for this particular system, only around about 8% at 5000 psig, and about 10% at 8000 psig.

TABLE 1

Average viscosity of 30 pptg guar-based crosslinked fluid under different pressures.

| Pressure (psig) | Viscosity (cP at 10 s$^{-1}$) |
|---|---|
| 500 | 2845 |
| 2500 | 2922 |
| 5000 | 2610 |
| 8000 | 2561 |
| 5000 | 2897 |
| 2500 | 2949 |
| 500 | 2933 |

Example 2

Figure 6:
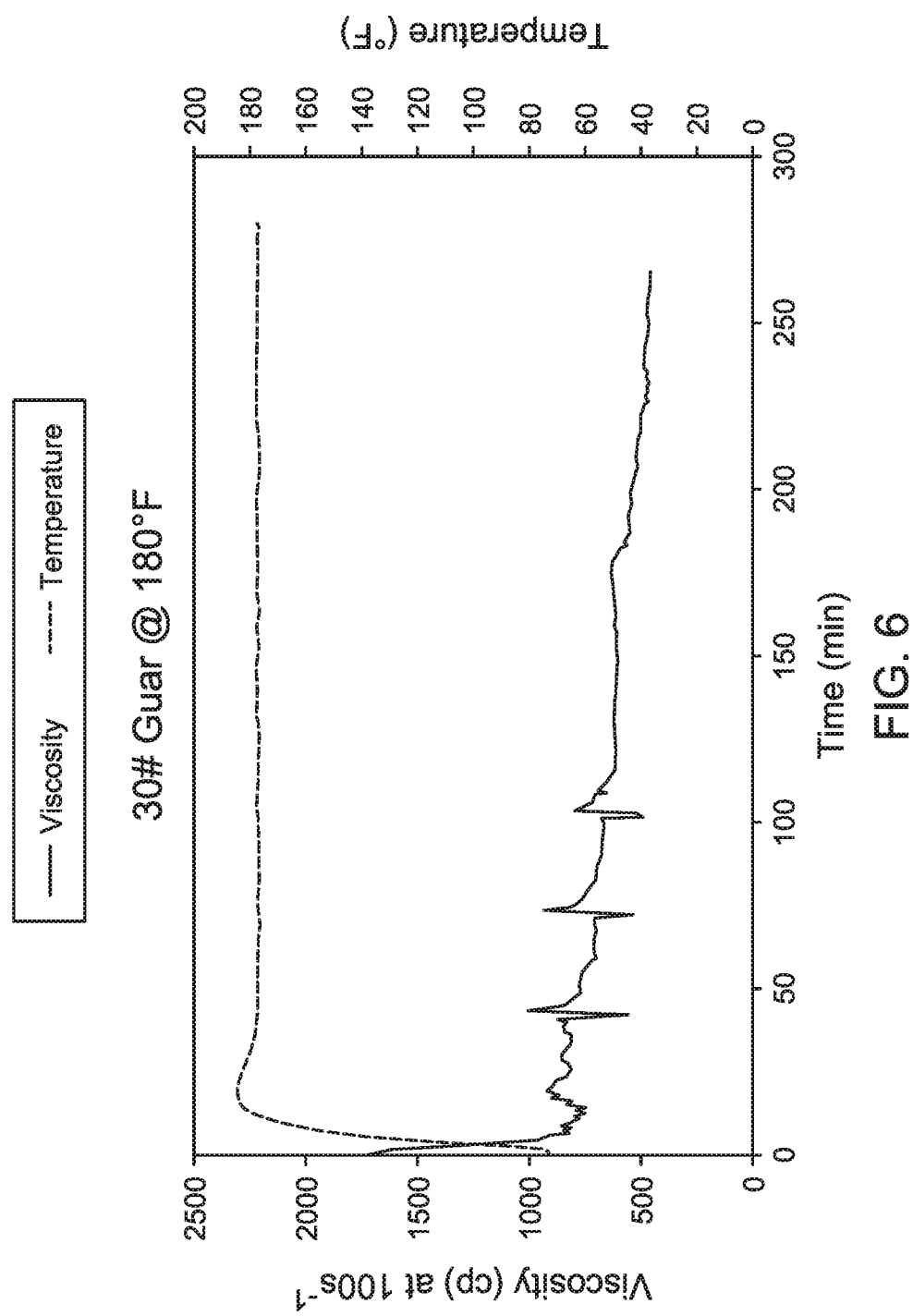
FIG. 6 is a graph showing viscosity in cP at 180° F. for a 30 pptg guar-based fracturing fluid crosslinked with triethanolamine borate at pH 9.3 using API RP 39 shear ramp testing.
Figure 7:
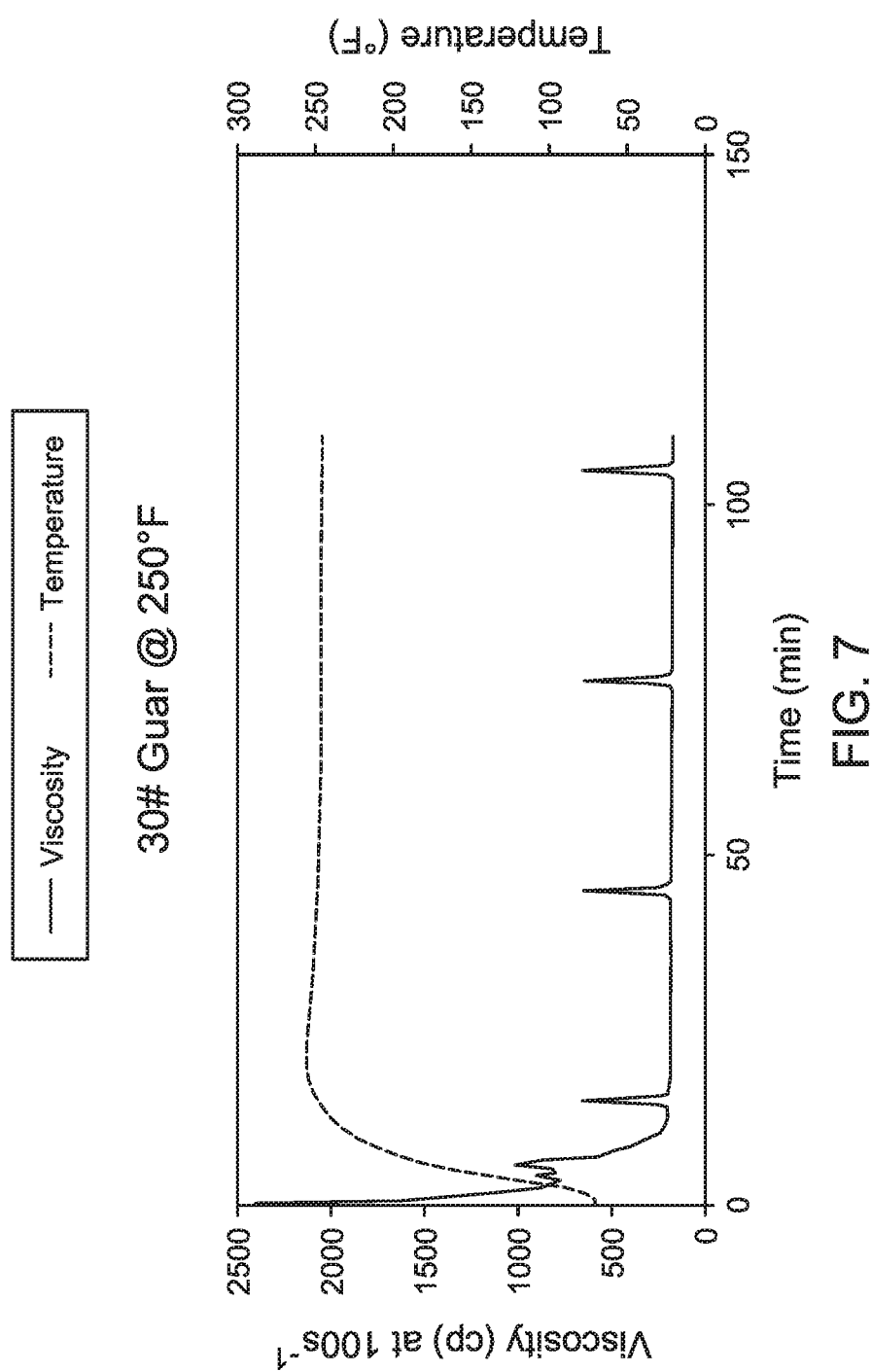
FIG. 7 is a graph showing viscosity at 250° F. for a 30 pptg guar-based fracturing fluid crosslinked with triethanolamine borate at pH 9.3 using API RP 39 shear ramp testing.

Generally, optimized conditions for crosslinking fluids comprising guar and borates include a high pH environment (fluid pH at about 8 or greater). However, divalent ions in water sources such as calcium and magnesium tend to precipitate out with hydroxide ions at pH values greater than about pH 9.5. In Example 2, the tested fluid was formulated to pH less than pH 9.5 (pH 9.3) with 30 pptg guar slurry, 2 gpt of 10% by weight NaOH solution, and 10 gpt of 30% by weight triethanolamine solution. FIG. 6 shows the viscosity profile at 180° F. for the tested crosslinked fluid using the API RP 39 shear ramp testing procedure. The viscosity stays greater than 500 cP for about 4 hours at 180° F. The same fluid was tested at 250° F. (FIG. 7). The viscosity remained at about 180 cP for about 2 hours of the testing time at 250° F.

Example 3

Figure 8:
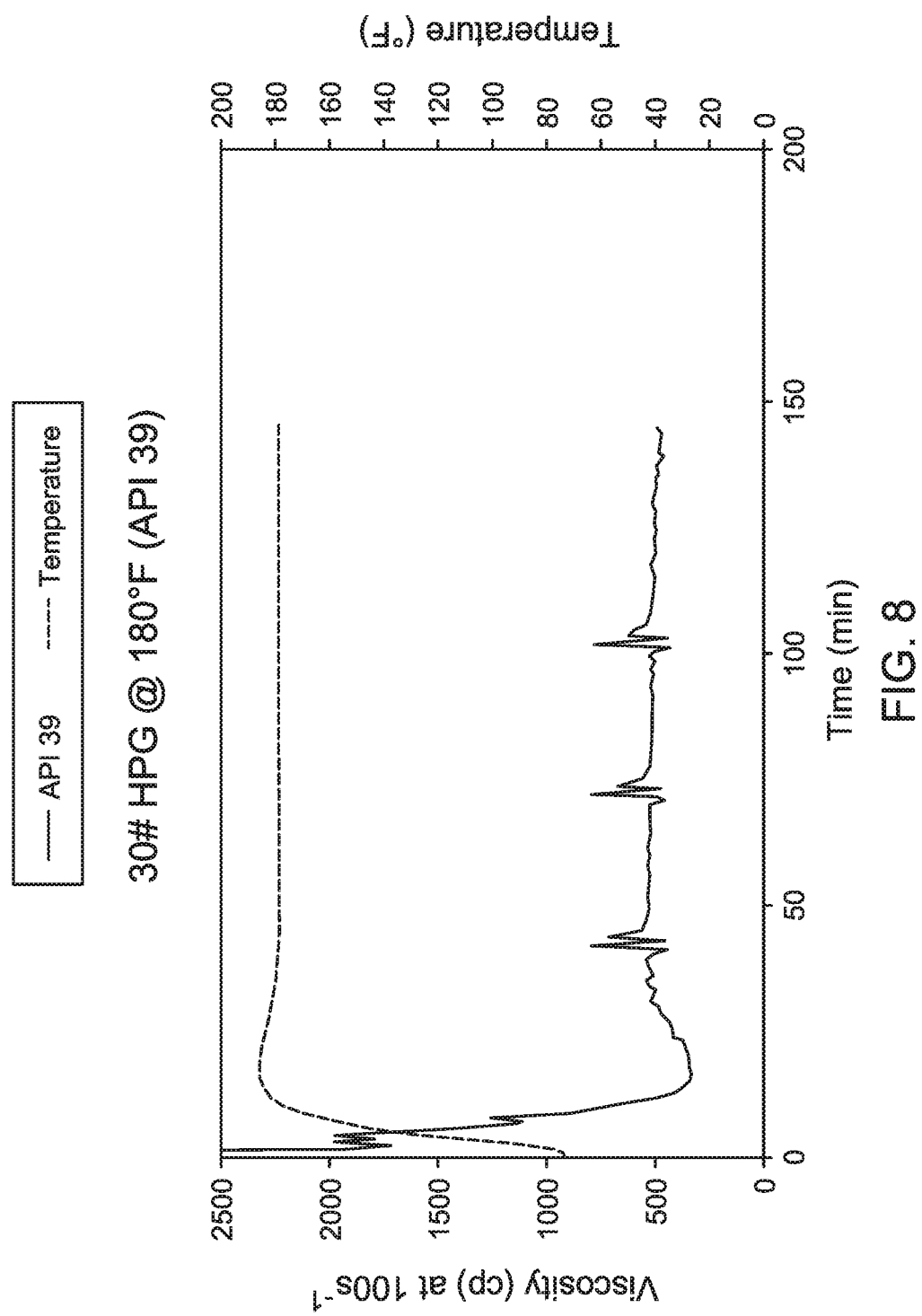
FIG. 8 is a graph showing viscosity in cP at 180° F. for 30 pptg hydroxypropyl guar (HPG) crosslinked with triethanolamine borate at pH 9.3 using API RP 39 shear ramp testing.
Figure 9:
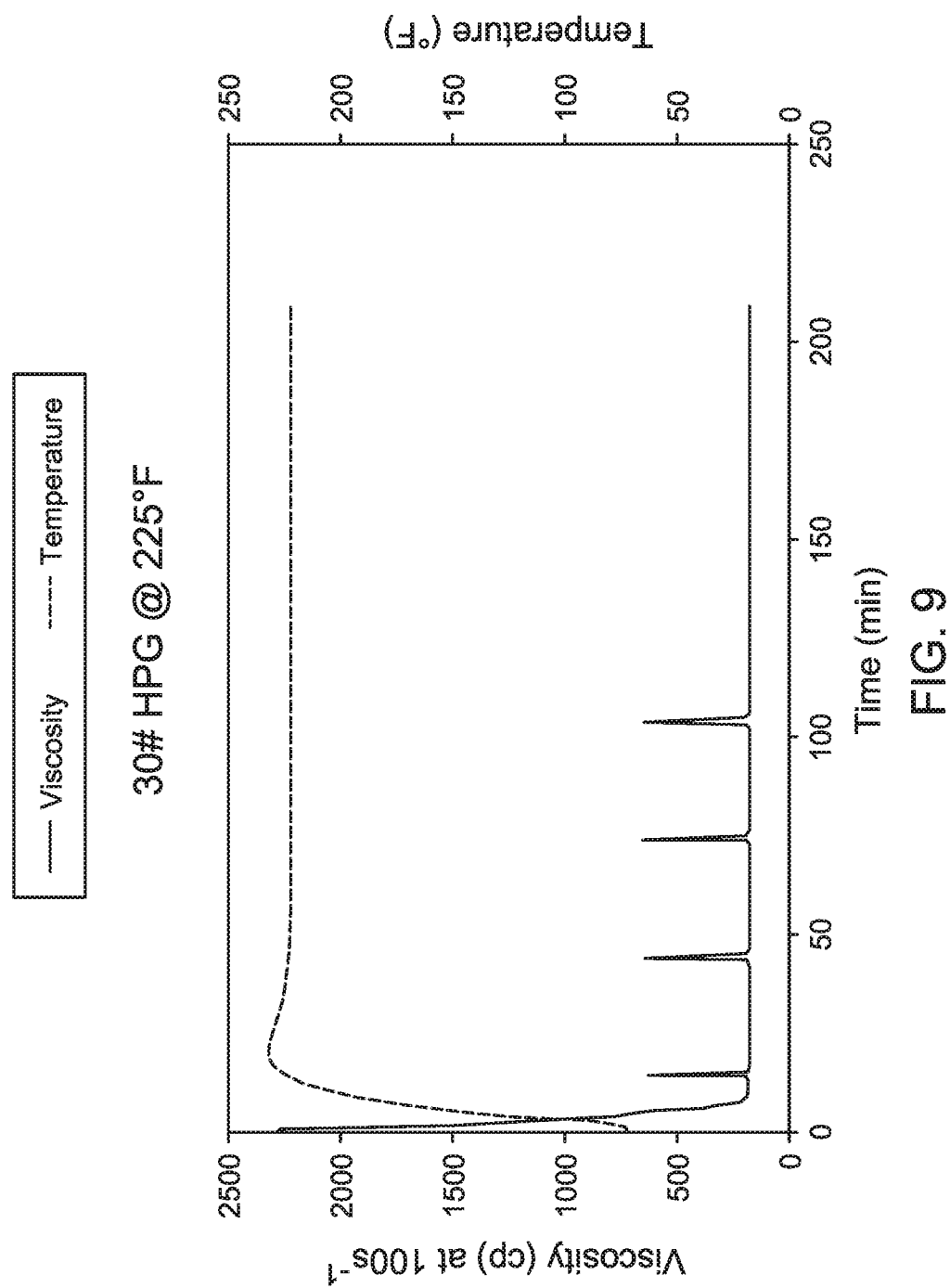
FIG. 9 is a graph showing viscosity in cP at 225° F. for 30 pptg HPG crosslinked with triethanolamine borate at pH 9.3 using API RP 39 shear ramp testing.

In addition to guar-based fluids, hydroxypropyl guar (HPG) has been tested with the alkanolamine borate crosslinkers. In Example 3, the tested fluid was formulated to pH less than 9.5 (pH 9.3) with 30 pptg HPG slurry, 2 gpt 10% by weight NaOH solution, and 10 gpt of 30% by weight triethanolamine borate solution. FIG. 8 shows the viscosity profile at 180° F. for this crosslinked fluid using the API RP 39 shear ramp test. The viscosity stays greater than 500 cP for about 2.5 hours of the testing time at 180° F. The same fluid was tested at 225° F. (FIG. 9). The viscosity remained at 170 cP for about 3 hours of the testing time at 225° F.

Example 4

In Example 4, an alkanolamine borate crosslinked fracturing fluid was prepared with synthetic seawater. A water analysis of the seawater sample is shown in Table 2 as follows. The total dissolved solids (TDS) content of the seawater was about 57,000 milligrams/liter (mg/L), and the total hardness was about 10,200 mg/L. The fluid was formulated with 30 pptg of guar slurry, and crosslinked with triethanolamine borate. The fluid also contained other additives such as a pH buffer and sorbitol derivatives. The pH buffer used in the experiment was tetraethylenepentamine, and the overall pH of the prepared fluid was pH 9.53. In some embodiments, a sugar alcohol derivative is included in the composition. The sugar alcohol derivative may include at least one derivative of sorbitol.

A concentration of the sugar alcohol derivative in a fracturing fluid composition may be in a range of about 0.01 wt. % to about 10 wt. %, about 0.05 wt. % to about 5 wt. %, or about 0.05 wt. % to about 2 wt. %. In certain embodiments, the sugar alcohol derivative includes an alkylated sugar alcohol. The sorbitol derivative used in the experiment was Ethox 3571 from Ethox Chemicals of Greeneville, S.C. The formulation for the fluid was 30 pptg guar slurry, 5 pptg $Na_2S_2O_3$, 2 gpt Ethox 3571, 2.5 gpt tetraethylenepentamine, and 10 gpt of 30% by weight triethanolamine borate solution.

Figure 10:
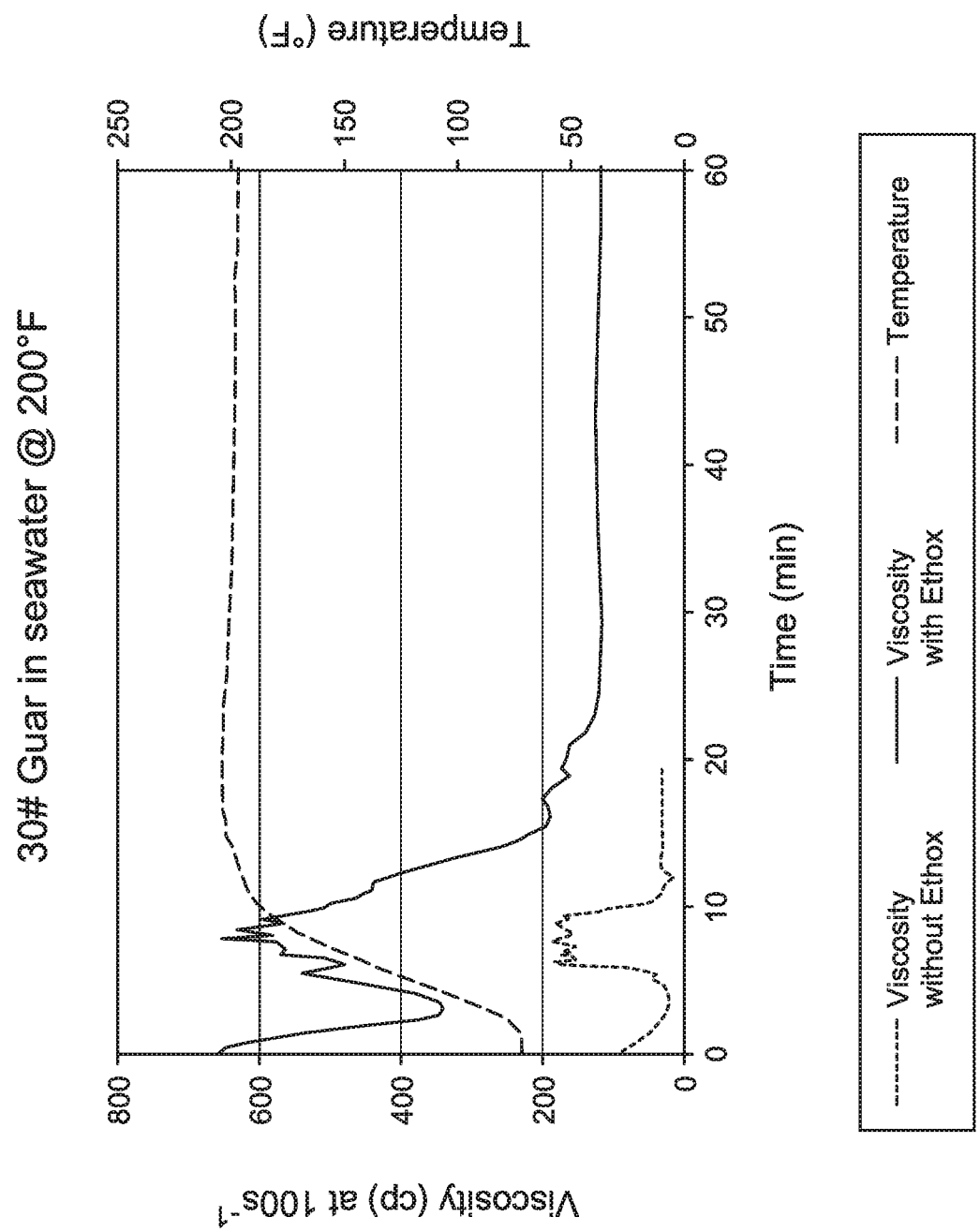
FIG. 10 is a graph showing viscosity in cP at 200° F. for 30 pptg guar in seawater crosslinked with triethanolamine borate at pH 9.5 using constant shear rate of 100 $s^{-1}$ for testing, for both a composition with Ethox and a composition without Ethox.

The fluid pH at room temperature was about pH 9.5. FIG. 10 shows the viscosity profile at 200° F. for the crosslinked fluid ("Viscosity with Ethox") at constant shear rate of 100 $s^{-1}$. The fluid viscosity at 200° F. remained greater than 100 cP (at 100 $s^{-1}$ shear rate) for at least 60 minutes. As a comparison, one fluid was prepared with 30 pptg guar slurry, 5 pptg $Na_2S_2O_3$, 2.5 gpt tetraethylenepentamine, and 10 gpt of 30% by weight triethanolamine borate solution and without addition of Ethox 3571 ("Viscosity without Ethox"). Once the temperature reached about 200° F., the viscosity for the fluid without Ethox was only around 30 cP at 100 $s^{-1}$.

TABLE 2

Water analysis of the seawater sample.

| Seawater Component/Property | Value |
|---|---|
| Boron | <1 mg/L |
| Barium | <1 mg/L |
| Calcium | 618 mg/L |
| Iron | <1 mg/L |
| Magnesium | 2,108 mg/L |
| Potassium | 595 mg/L |
| Silicon | <1 mg/L |
| Sodium | 18,451 mg/L |
| Strontium | 11 mg/L |
| Chloride | 30,694 mg/L |
| Sulfate | 4,142 mg/L |
| Carbonate | <1 mg/L |
| Bicarbonate | 150 mg/L |
| TDS | 56,800 mg/L |
| Total Hardness | 10,200 mg/L |
| pH | 8.1 |

That claimed is:

1. A method for formulating a hydraulic fracturing fluid composition with improved resistance to viscosity decay at increased temperature and pressure, the method comprising the steps of:
   preparing an alkanolamine borate formulation compatible for mixing with a hydraulic fracturing fluid comprising polysaccharides, the alkanolamine borate formulation comprising a pre-reacted, hydrolytically stable alkanolamine borate;
   preparing the hydraulic fracturing fluid comprising polysaccharides, such that the polysaccharides are present at about 30 pounds per one thousand gallons (pptg) or less; and
   mixing the alkanolamine borate formulation with the hydraulic fracturing fluid, such that the alkanolamine borate formulation causes crosslinking of the hydraulic fracturing fluid.

2. The method according to claim 1, where the alkanolamine borate formulation comprises an alkanolamine borate compound selected from the group consisting of: triethanolamine borate; diethanolamine borate; tri-isopropanol amine borate; n-propanolamine borate; N,N-dimethyl ethanolamine borate; N,N-diethyl ethanolamine borate; N,N-dipropyl ethanolamine borate; and combinations thereof.

3. The method according to claim 2, where the hydraulic fracturing fluid comprises a polysaccharide selected from the group consisting of: guar; hydroxypropyl guar; and combinations thereof.

4. The method according to claim 1, where the step of mixing is carried out at a pH between about pH 8.5 to about pH 13.

5. The method according to claim 1, where the step of mixing is carried out at a pH less than about pH 9.5.

6. The method according to claim 1, where the step of preparing the alkanolamine borate formulation includes mixing the pre-reacted alkanolamine borate with water.

7. The method according to claim 1, where the step of preparing the hydraulic fracturing fluid comprising polysaccharides includes hydrating a non-aqueous polysaccharide liquid suspension with water.

8. The method according to claim 1, further comprising the step of mixing with the hydraulic fracturing fluid composition at least one pH control agent selected from the group consisting of: hydroxide salts; carbonates; bicarbonates; amine-containing organic compounds; and combinations thereof.

9. The method according to claim 8, where the pH control agent comprises tetraethylenepentamine.

10. The method according to claim 1, further comprising the step of mixing with the hydraulic fracturing fluid composition at least one antioxidant component selected from the group consisting of: phenols; polyphenols; di-tert-butyl alkyl phenols; sodium thiosulfate; sodium sulfite; sodium bisulfite; thiourea; and combinations of the same.

11. The method according to claim 1, where concentration of the alkanolamine borate formulation in the hydraulic fracturing fluid composition is between about 1 gallon per one thousand gallons of fluid (gpt) to about 20 gpt of about 30% by weight alkanolamine borate solution.

12. The method according to claim 1, where concentration of the alkanolamine borate formulation in the hydraulic fracturing fluid composition is about 10 gpt of about 30% by weight alkanolamine borate solution.

13. The method according to claim 1, where the hydraulic fracturing fluid composition comprises between about 1 gpt to about 20 gpt of about 10% by weight NaOH solution.

14. The method according to claim 1, where the step of preparing the hydraulic fracturing fluid comprising polysaccharides includes mixing seawater with a non-aqueous polysaccharide liquid suspension.

15. A hydraulic fracturing fluid composition with improved resistance to viscosity decay at increased temperature and pressure, the composition comprising:
   an alkanolamine borate formulation compatible for mixing with a hydraulic fracturing fluid comprising polysaccharides, the alkanolamine borate formulation comprising a pre-reacted, hydrolytically stable alkanolamine borate; and
   a hydraulic fracturing fluid comprising polysaccharides, where the polysaccharides are present at about 30 pptg or less,
   where a suitable concentration of the alkanolamine borate formulation causes crosslinking of the hydraulic fracturing fluid.

16. The composition according to claim 15, where the alkanolamine borate formulation comprises an alkanolamine borate compound selected from the group consisting of: triethanolamine borate; diethanolamine borate; tri-isopropanol amine borate; n-propanolamine borate; N,N-dimethyl ethanolamine borate; N,N-diethyl ethanolamine borate; N,N-dipropyl ethanolamine borate; and combinations thereof.

17. The composition according to claim 16, where the hydraulic fracturing fluid comprises a polysaccharide selected from the group consisting of: guar; hydroxypropyl guar; and combinations thereof.

18. The composition according to claim 15, where the pH of the hydraulic fracturing fluid composition is between about pH 8.5 to about pH 13.

19. The composition according to claim 15, where the pH of the hydraulic fracturing fluid composition is less than about pH 9.5.

20. The composition according to claim 15, where the hydraulic fracturing fluid composition further comprises water.

21. The composition according to claim 15, where the hydraulic fracturing fluid composition further comprises seawater.

22. The composition according to claim 15, further comprising at least one pH control agent selected from the group consisting of: hydroxide salts; carbonates; bicarbonates; amine-containing organic compounds; and combinations thereof.

23. The composition according to claim 22, where the pH control agent comprises tetraethylenepentamine.

24. The composition according to claim 15, further comprising at least one antioxidant component selected from the group consisting of: phenols; polyphenols; di-tert-butyl alkyl phenols; sodium thiosulfate; sodium sulfite; sodium bisulfite; thiourea; and combinations of the same.

25. The composition according to claim 15, where concentration of the alkanolamine borate formulation in the hydraulic fracturing fluid composition is between about 1 gallon per one thousand gallons of fluid (gpt) to about 20 gpt of about 30% by weight alkanolamine borate solution.

26. The composition according to claim 15, where concentration of the alkanolamine borate formulation in the hydraulic fracturing fluid composition is about 10 gpt of about 30% by weight alkanolamine borate solution.

27. The composition according to claim 15, where the hydraulic fracturing fluid composition comprises between about 1 gpt to about 20 gpt of about 10% by weight NaOH solution.

28. The composition according to claim 15, where viscosity reduction of the hydraulic fracturing fluid composition at about 5,000 pounds per square inch gauge (psig) is less than about 10%.

29. The composition according to claim 15, where viscosity reduction of the hydraulic fracturing fluid composition at about 8,000 pounds per square inch gauge (psig) is less than about 15%.

* * * * *